United States Patent
Kitazoe et al.

(10) Patent No.: US 8,867,436 B2
(45) Date of Patent: Oct. 21, 2014

(54) SUPPORT FOR OPTIONAL SYSTEM PARAMETER VALUES

(75) Inventors: Masato Kitazoe, Tokyo (JP); Valentin A. Gheorghiu, Tokyo (JP); Masakazu Shirota, Tokyo (JP); Nathan E. Tenny, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 12/846,613

(22) Filed: Jul. 29, 2010

(65) Prior Publication Data

US 2011/0182234 A1     Jul. 28, 2011

Related U.S. Application Data

(60) Provisional application No. 61/230,353, filed on Jul. 31, 2009.

(51) Int. Cl.
H04W 4/00 (2009.01)
H04W 48/18 (2009.01)
H04W 48/08 (2009.01)

(52) U.S. Cl.
CPC .............. *H04W 48/18* (2013.01); *H04W 48/08* (2013.01)
USPC .......................................... 370/328; 455/522

(58) Field of Classification Search
None
See application file for complete search history.

(56) References Cited

U.S. PATENT DOCUMENTS

| 6,493,561 B1 | 12/2002 | Hasegawa |
| 2006/0217124 A1 | 9/2006 | Bi et al. |
| 2007/0237254 A1 | 10/2007 | Pi |
| 2008/0182605 A1 | 7/2008 | Yamaoka et al. |
| 2008/0280575 A1* | 11/2008 | Pesola .......................... 455/127.1 |
| 2010/0118805 A1* | 5/2010 | Ishii et al. ........................ 370/329 |

FOREIGN PATENT DOCUMENTS

| CN | 101461192 A | 6/2009 |
| EP | 2141935 A1 | 1/2010 |
| JP | 10013908 | 1/1998 |
| JP | 2006270968 A | 10/2006 |
| JP | 2008187555 A | 8/2008 |
| WO | WO2007138530 | 12/2007 |
| WO | WO 2008/123148 | * 10/2008 |

OTHER PUBLICATIONS

"Collins English Dictionary—Complete and Unabridged", 2003, HarperCollins Publishers.*
International Search Report and Written Opinion—PCT/US2010/044025, International Searching Authority—European Patent Office, Oct. 29, 2010.

(Continued)

*Primary Examiner* — Mohammad Adhami
(74) *Attorney, Agent, or Firm* — Anthony R. Morris

(57) ABSTRACT

Aspects describe conveying optional network signaled values that can be utilized for communication in a communications environment. A method that includes generating a first network signaled value and a second network signaled value and transmitting first network signaled value and second network signaled value to at least one mobile device is provided. A communications apparatus, comprising a memory that retains instructions related to obtaining a first network signaled value and a second network signaled value from an access point and applying first network signaled value or second network signaled value for communication in a network as a function of a priority is also provided. Also provided are optional network signaled values that can be utilized separately from a mandatory network signaled value.

39 Claims, 10 Drawing Sheets

(56) References Cited

OTHER PUBLICATIONS

Motorola: "TS36.101: TP for spectrum emission mask" 3GPP Draft: R4-080317, 3rd Generation Partnership Project (3GPP), Sophia-Antipolis Cedex, France; Sorrento, Italy, Feb. 5, 2008, XP050178948.

Qualcomm Europe: "A-MPR Definitions" 3GPP Draft; R4-080201, 3rd Generation Partnership Project (3GPP), Sophia-Antipolis Cedex, France; Sorrento, Italy, Feb. 5, 2008, XP050178845.

Motorola, "TS36.101: Specification update", 3GPP TSG RANWG4(Radio) Meeting #46, R4-080310, Feb. 5, 2008.

Qualcomm Europe, "Support for optional NS values", 3GPP TSG-RAN WG4 #52 R4-093120, Aug. 28, 2009.

"3rd Generation Partnership Project; Technical Specification Group Radio Access Network; Evolved Universal Terrestrial Radio Access (E-UTRA); User Equipment (UE) radio transmission and reception (Release 8)", 3GPP TS 36.101 V8.0.0 (Dec. 2007), 650 Route des Lucioles—Sophia Antipolis, Valbonne—France.

* cited by examiner

SUPPORT FOR OPTIONAL SYSTEM PARAMETER VALUES

CROSS-REFERENCE

This is an application claiming priority to Provisional Application No. 61/230,353 entitled "SUPPORT FOR OPTIONAL SYSTEM PARAMETER VALUES" filed Jul. 31, 2009, and assigned to the assignee hereof and hereby expressly incorporated by reference herein.

BACKGROUND

I. Field

The following description relates generally to wireless communications systems and more particularly to communication of network signaled values.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. Forward link (or downlink) refers to the communication link from base stations to mobile devices. Reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (e.g., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

A MIMO system employs multiple (NT) transmit antennas and multiple (NR) receive antennas for data transmission. A MIMO channel formed by the NT transmit and NR receive antennas may be decomposed into Nz independent channels, which are also referred to as spatial channels. Generally, each of the Nz independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Further, spectrum emissions masks (SEM) are defined in wireless standards, such as 3GPP, to support coexistence between communications systems operating in the same frequency band. In certain bands, some existing systems have tighter interference requirements and, therefore, wireless standards support SEMs other than those generally defined. For example, in 3GPP, additional SEMs are signaled by the network in system information block (SIB) messages as network signaled (NS) values (e.g., NS_01x). A mobile device that receives and decodes the SIB adjusts its emissions according to the NS values. In current systems, support of defined NS values is mandatory for all devices operating in a spectrum (e.g., that support the frequency band).

In addition, current procedures for signaling SEMs (and system parameters generally) support the signaling of base values (e.g., main values) and additional values of system parameters in information elements (IEs) of SIBs. Such procedures assume that the additional value is a subset or an enhanced value of the base value and cannot be signaled as a base value.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with a method comprising receiving a first network signaled value and a second network signaled value from an access point. Method also comprises utilizing first network signaled value or second network signaled value as a function of a priority. First network signaled value is a mandatory value and second network signaled value is an optional value.

Another aspect relates to a communications apparatus comprising a memory and a processor. Memory retains instructions related to obtaining a first network signaled value and a second network signaled value from an access point and applying first network signaled value or second network signaled value for communication in a network as a function of a priority. First network signaled value is a mandatory value and second network signaled value is an optional value. Processor is coupled to memory and is configured to execute instructions retained in memory.

A further aspect relates to a communications apparatus that supports optional system parameter values. Communication apparatus comprises means for receiving a first network signaled value and a second network signaled value from an access point. Communication apparatus also comprises means for utilizing first network signaled value or second network signaled value as a function of a priority. First network signaled value is a mandatory value and second network signaled value is an optional value and second network signaled value is assigned a higher priority than first network signaled value. In accordance with some aspects, means for utilizing comprises means for using second network signaled value as an alternative to first network signaled value.

According to some aspects, communications apparatus comprises means for determining the priority associated with second network signaled value and means for selecting second network signaled value from a plurality of received optional network signaled values based on the priority, wherein the plurality of received optional network signaled values comprises a set of second network signaled values that are supported. In an aspect, means for determining comprises means for determining the priority from a signaled priority value. In another aspect, means for determining comprises means for determining the priority based on a signaling structure.

Another aspect relates to computer program product comprising a computer-readable medium. Included in computer-readable medium is a first set of codes for causing a computer to obtain a first network signaled value and a second network signaled value from an access point. Also included in computer-readable medium is a second set of codes for causing computer to apply first network signaled value or second network signaled value as a function of a priority. First network signaled value is a mandatory value and second network signaled value is an optional value.

Yet another aspect relates to at least one processor configured to support optional system parameter values. At least one processor comprises a first module that receives a first network signaled value and a second network signaled value from an access point. At least one processor also comprises a second module that utilizes first network signaled value or second network signaled value as a function of a priority. First network signaled value is a mandatory value and second network signaled value is an optional value.

Still another aspect relates to a method comprising generating a first network signaled value and a second network signaled value. Method also comprises transmitting first network signaled value and second network signaled value to at least one mobile device. First network signaled value is a mandatory value and second network signaled value is an optional value.

Another aspect relates to a communications apparatus comprising a memory and a processor. Memory retains instructions related to generating a first network signaled value and a second network signaled value and transmitting first network signaled value and second network signaled value to at least one mobile device. First network signaled value is a mandatory value and second network signaled value is an optional value. Processor is coupled to memory and is configured to execute instructions retained in memory.

A further aspect relates to communications apparatus that supports optional system parameter values. Communications apparatus comprises means for generating a first network signaled value and a second network signaled value. Communications apparatus also comprises means for transmitting first network signaled value and second network signaled value to at least one mobile device, wherein first network signaled value is a mandatory value and second network signaled value is an optional value. In an aspect, means for generating comprises means for producing first network signaled value for a plurality of mobile devices and second network signaled value for a subset of the plurality of mobile devices.

In accordance with some aspects, communications apparatus comprises means for defining a priority related to second network signaled value and means for sending the priority to at least one mobile device. Means for defining can comprise means for establishing a message structure, wherein a priority is implicit in the message structure.

A further aspect relates to a computer program product comprising a computer-readable medium. Included in computer-readable medium is a first set of codes for causing a computer to generate a first network signaled value and a second network signaled value. Also included in computer-readable medium is a second set of codes for causing computer to transmit first network signaled value and second network signaled value to at least one mobile device, wherein first network signaled value is a mandatory value and second network signaled value is an optional value.

Another aspect relates to at least one processor configured to support optional system parameter values. At least one processor comprises a first module that defines a first network signaled value and a second network signaled value. At least one processor also comprises a second module that signals first network signaled value and second network signaled value to at least one mobile device. First network signaled value is a mandatory value and second network signaled value is an optional value.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
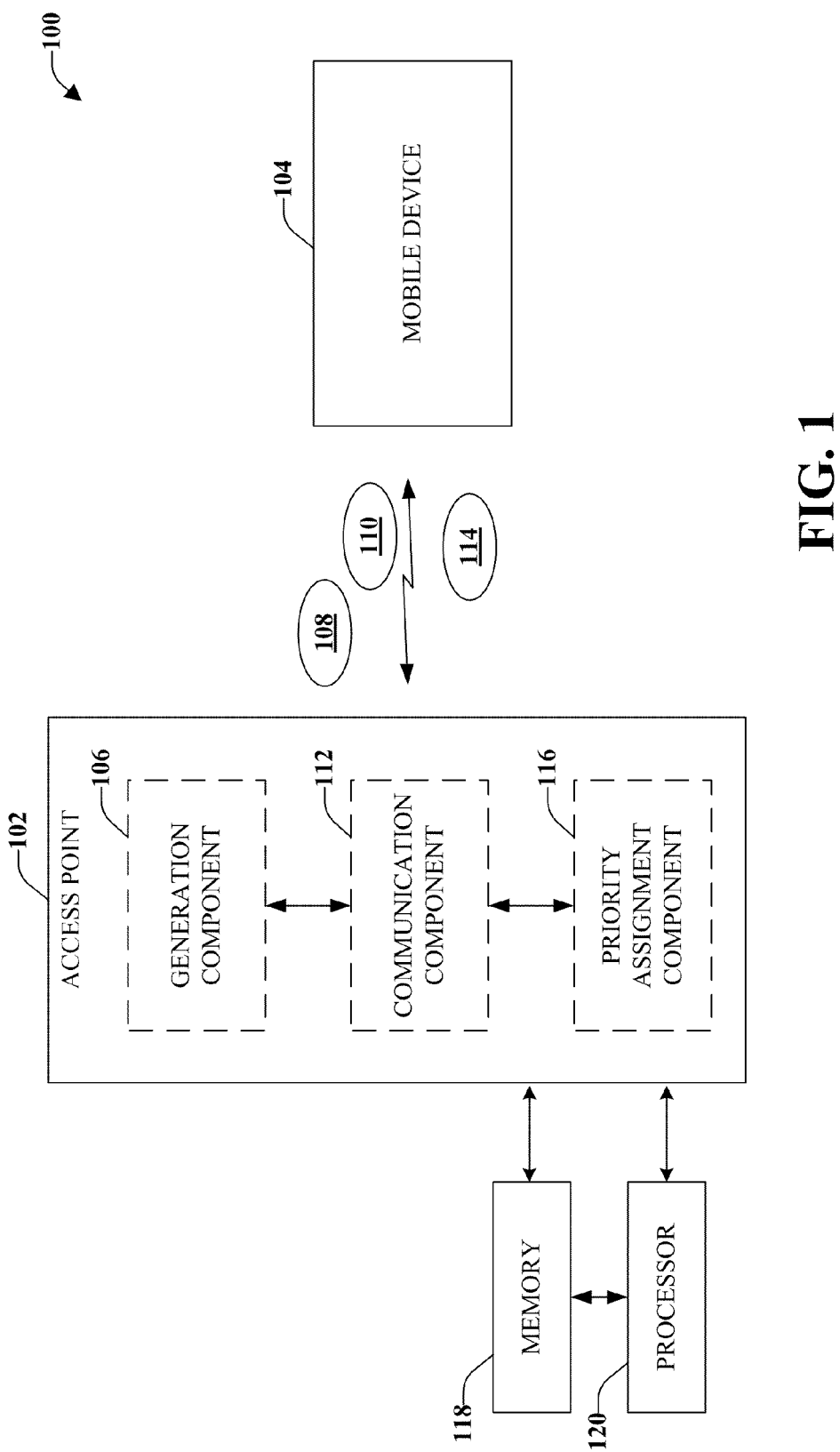
FIG. 1 illustrates a system that supports optional system parameter values, according to an aspect.

With reference to FIG. 1, illustrated is a system 100 that supports optional system parameter values, according to an aspect. System 100 can provide flexibility for using system parameters. For example, traditional systems only support mandatory values of spectrum emission masks. This static support can become a problem later when one or more emission masks constraints might change. System 100 is configured to dynamically provide support for changes in spectrum emission masks or optional system parameter values, which can provide support in a flexible and backwards compatible manner. System 100 can utilize one or more optional system parameter values (or spectrum emission mask values), which can be used separately, together, with an older value, or combinations thereof.

It should be noted that certain aspects are described with reference to LTE and LTE terminology is used for purposes of describing the aspects, however, the disclosed aspects are not limited to LTE and other implementations are also possible.

System 100 includes an access point 102 that communicates with a mobile device 104. Although a number of access points(s) 104 and mobile device(s) 104 can be included in system 100, as will be appreciated, a single access point 102 that exchanges communication data signals with a single mobile device 104 is illustrated for purposes of simplicity.

Access point 102 can comprise a network signaled value generation component 106 that is configured to define network signaled system parameters values that can be utilized by mobile device 104. For example, generation component 106 can define a first network signaled parameter value 108 and a second network signaled parameter value 110. In accordance with some aspects, first network signaled value 108 is a mandatory value and second network signaled value 110 is an optional value, wherein at least the mandatory value is signaled and the optional values can be additionally signaled.

According to some aspects, first network signaled value 108 is intended for a plurality of mobile devices and second network signaled value 110 is intended for a subset of the plurality of mobile devices. For example, a first set of mobile devices can have a first revision level and a second set of mobile devices can have a second revision level, and so forth. First network signaled value 108 can be intended for first set of mobile devices, second network signaled value 110 can be intended for second set of mobile devices, a third network signaled value can be intended for a third set of mobile devices, and so forth.

Also included in access point 102 is a communication component 112 that is configured to transmit first network signaled value 108 and second network signaled value 110 to mobile device 104. In accordance with some aspects, communication component 112 is configured to send subsequent network signaled values 114 (e.g., third network signaled value, fourth network signaled value, and so forth) to mobile device 104.

Access point 102 can also include a priority assignment component 116 that is configured to define a priority related to first network signaled value 108 and a priority related to second network signaled value 110. Priority assignment component 116 is also configured to assign priorities to subsequent network signaled values 114. In accordance with some aspects, priority assignment component 116 is configured to establish a message structure (or to cause a message structure to be created), wherein the priority is implicit in the message structure. In accordance with some aspects, priority assignment component 116 assigns a priority to second network signaled value that is a higher priority than the priority assigned to first network signaled value. Communication component 112 is configured to send the one or more priorities to mobile device 104.

According to some aspects, access point 102 can determine (e.g., based on revision levels) first network signaled value 108 is supported by a first set of mobile devices and second network signaled value 110 is supported by a second set of mobile devices. Communication component 112 transmits first network signaled value 108 and second network signaled value 110 to a plurality of mobile devices that comprises first set of mobile devices and second set of mobile devices.

According to some aspects, second network signaled value 110 is a base network signaled parameter value that can be used standalone, without first network signaled value 108. In accordance with some aspects, second network signaled value 110 relates to an additional optional spectrum emission mask (SEM). SEMs can govern the amount of excess interfering radiation each of the mobile devices is permitted to produce. Adding an optional value that is visible to newer mobile devices (e.g., devices having a newer revision level) can operate in at least two ways (1) where optional values can be utilized to relax restrictions on some mobile devices or (2) where optional values are utilized to further restrict a subset of mobile devices. For example, the network can insist that all mobile devices restrict their emissions to a certain level (e.g., 5 decibels). However, newer mobile devices that are aware of and capable of interpreting additional values (e.g., optional values) of the SEMs are allowed to go up to, for example, 6 decibels instead of only 5 decibels. This means that the network is prepared to tolerate 6 decibels of interference but the signaling format of the older revision level mobile devices do not have the granularity to signal the exact level and can only get as close as 5 decibels. Alternatively, the optional value can be more restrictive. In this example, all mobile devices are to limit their emission to 5 decibels of interference. However, mobile devices that are capable of supporting an optional value are required to limit their emission to 3 decibels, for example.

System 100 can include memory 118 operatively coupled to access point 102. Memory 118 can be external to access point 102 or can reside within access point 102. Memory 118 can retain instructions related to generating a first network signaled value and a second network signaled value and transmitting first network signaled value and second network signaled value to at least one mobile device. First network signaled value is a mandatory value and second network signaled value is an optional value.

In accordance with some aspects, memory 118 can retain further instructions related to generating first network signaled value for a plurality of mobile devices and generating second network signaled value for a subset of the plurality of mobile devices. According to some aspects, memory 118 retains further instructions related to defining a priority related to second network signaled value and sending the priority to at least one mobile device. In accordance with some aspects, memory 118 retains further instructions related to assigning a priority to the second network signaled value that is a higher priority than the priority assigned to the first network signaled value.

According to some aspects, memory 118 retains further instructions related to establishing a message structure, wherein a priority is implicit in the message structure. In accordance with some aspects, memory 118 retains further instructions related to conveying at least a third network signaled value to at least one mobile device.

Memory 118 can store protocols associated with supporting optional system parameter values, taking action to control communication between access point 102 and mobile device 104 such that system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 120 can be operatively connected to access point 102 (and/or memory 118) to facilitate analysis of information related to optional system parameter values in a communication network. Processor 120 can be a processor dedicated to analyzing and/or generating information received by access point 102, a processor that controls one or more components of system 100, and/or a processor that both analyzes and generates information received by access point 102 and controls one or more components of system 100.

In accordance with some aspects, processor 120 is configured to support optional system parameter values. Processor 120 can include a first module that defines a first network signaled value and a second network signaled value. Processor 120 can also include a second module that signals first network signaled value and second network signaled value to at least one mobile device. First network signaled value can be a mandatory value and second network signaled value can be an optional value.

In accordance with some aspects, first module generates first network signaled value for a plurality of mobile devices and generates second network signaled value for a subset of the plurality of mobile devices. According to some aspects, processor 120 can comprise a third module that assigns a priority related to second network signaled value and a fourth module that conveys the priority to at least one mobile device.

Figure 2:
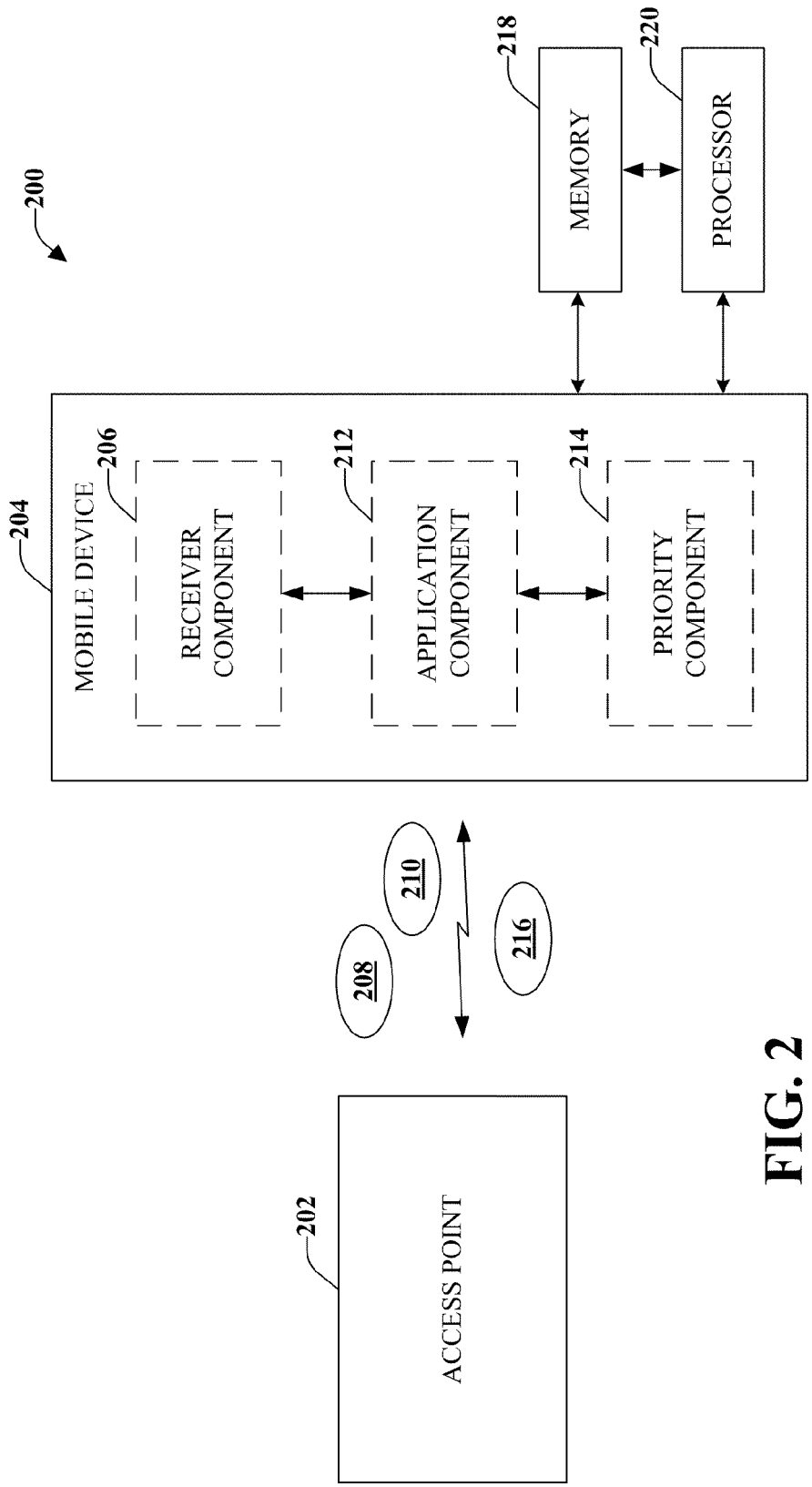
FIG. 2 illustrates a system that facilitates communication of network signaled values, according to an aspect.

FIG. 2 illustrates a system 200 that facilitates communication of network signaled values, according to an aspect. System 200 is similar to system 100 of the above figure and includes an access point 202 and a mobile device 204. Mobile device 204 comprises a receiver component 206 that is configured to receive a first network signaled value 208 and a second network signaled value 210 that was transmitted by access point 202. First network signaled value 208 can be a mandatory value and second network signaled value 210 can be an optional value. Thus, when network signaling is applied, at least the mandatory value is received. According to an aspect, second network signaled value 210 relates to an additional optional spectrum emission mask (SEM). According to some aspects, second network signaled value 210 is a base network signaled value that can be utilized without the first signaled value.

In accordance with some aspects, receiver component 206 is configured to receive other communications from access point 202 and other system nodes (e.g., access points, mobile devices, communication devices).

Also included in mobile device 204 is an application component 212 that is configured to apply first network signaled value 208, second network signaled value 210, other network signaled values, or combinations thereof. For example, application component 212 can utilize second network signaled value 210 at substantially the same time as first network signaled value 208. According to some aspects, application component 212 utilizes second network signaled value 210 instead of first network signaled value 208, wherein utilization of second network signaled value 210 is allowed when first network signaled value 208 is not supported by mobile device 204.

According to one or more aspects, application component 212 applies first network signaled value 208 and/or second network signaled value 210 as a function of a priority. A priority component 214 can ascertain a priority that is associated with second network signaled value 210. According to some aspects, priority component 214 can utilize second network signaled value 210 if there is no priority assigned. According to some aspects, second network signaled value 210 is given a higher priority over first network signaled value 208.

According to some aspects, the priority can be determined by priority component 214 as a function of a signaled priority value. For example, the priority value can be signaled by access point 202 at substantially the same time as second network signaled value 210 is sent. According to some aspects, the priority value is signaled by access point 202 at a different time (e.g., not at about the same time as second network signaled value 210 is sent by access point 202 but at a different time).

In accordance with some aspects, priority component 214 ascertains the priority as a function of a signaling structure, wherein the priority is implicit in the structure of the message. In an aspect, a signaling structure can be defined wherein network signaled values are transmitted by access point 202 in an order of priority. For example, first network signaled value 208 is sent, then second network signaled value 210 is sent, and then one or more subsequent network signaled values 216 are sent in order (e.g., a third network signaled value, then a fourth network signaled value, then a fifth network signaled value, and so forth). In this example, the highest priority network signaled value is the last value that can be received and decoded (e.g., supported) by mobile device 204. For example, if mobile device 204 can decode third network signaled value, then third network signaled value is the highest priority and should be utilized. However, if mobile device 204 cannot decode (or receive) third network signaled value, then second network signaled value 210 is the highest priority for mobile device 204. In a similar manner, if fourth, fifth, or a subsequent network signaled values can be received and decoded by mobile device 204, the last network signaled value that is able to be supported by mobile device 204 is the highest priority and should be utilized by mobile device 204.

In an aspect, priority component 214 can determine a priority associated with second network signaled value 210.

Priority component 214 can also determine a priority associated with each of a plurality of received optional network signaled values 216. The received optional network signaled values 216 can comprise a set of second network signaled values that are supported. If the priority of second network signaled value 210 is the highest priority, as determined by priority component 214, second network signaled value 210 is selected from a plurality of received optional network signaled values based on the priority. In accordance with some aspects, at least one of the plurality of received optional network signaled values 216 is utilized at substantially the same time as second network signaled value 210 is utilized.

System 200 can include memory 218 operatively coupled to mobile device 204. Memory 218 can be external to mobile device 204 or can reside within mobile device 204. Memory 218 can store information related to obtaining a first network signaled value and a second network signaled value from an access point 202. Memory 218 can retain further instructions related to applying first network signaled value or second network signaled value for communication in a network as a function of a priority. The first network signaled value can be a mandatory value and second network signaled value can be an optional value.

In accordance with some aspects, memory 218 retains further instructions related to utilizing second network signaled value with or as an alternative to first network signaled value. According to some aspects, memory 218 retains further instructions related to determining the priority associated with second network signaled value and selecting second network signaled value from a plurality of received optional network signaled values based on the priority. For example, if second network signaled value has a higher priority than at least one priority of other network signaled values, second network signaled value is chosen. However, if at least one of the other network signaled values has a higher priority than second network signaled value, then the network signaled value with the highest priority is chosen.

According to some aspects, memory 218 retains further instructions related to determining the priority based on a signaled priority value. According to some aspects, memory 218 retains further instructions related to determining the priority based on a signaling structure. In some aspects, memory 218 retains further instructions related to utilizing at least one of a plurality of received optional network signaled values at about the same time as second network signaled value.

Memory 218 can store protocols associated with supporting optional system parameter values, taking action to control communication between mobile device 204 and access point 202, such that system 200 can employ stored protocols and/or algorithms to achieve improved communications in a wireless network as described herein.

At least one processor 220 can be operatively connected to mobile device 204 (and/or memory 218) to facilitate analysis of information related to support for optional system parameter values in a communication network. Processor 220 can be a processor dedicated to analyzing and/or generating information received by mobile device 204, a processor that controls one or more components of system 200, and/or a processor that both analyzes and generates information received by mobile device 204 and controls one or more components of system 200.

In accordance with some aspects, processor 220 is configured to support optional system parameter values. Processor 220 can include a first module that receives a first network signaled value and a second network signaled value from an access point. Processor 220 can also include a second module that utilizes first network signaled value or second network signaled value as a function of a priority. First network signaled value is a mandatory value and second network signaled value is an optional value.

In accordance with some aspects, processor 220 comprises a third module that determines the priority associated with second network signaled value. Processor 220 can also comprises a fourth module that selects second network signaled value from a plurality of received optional network signaled values based on the priority. The plurality of received optional network signaled values can comprise a set of second network signaled values that are supported.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, combinations thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
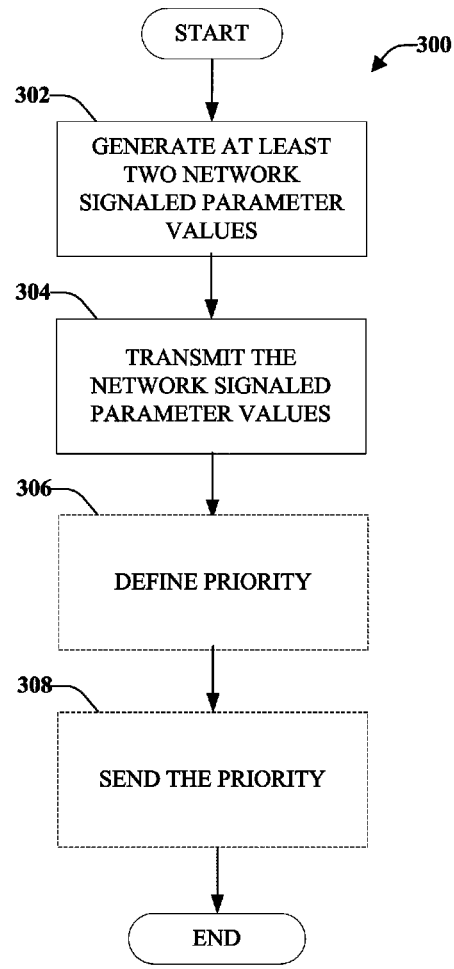
FIG. 3 illustrates a method for support of optional network signaled values, according to an aspect.

FIG. 3 illustrates a method 300 for support of optional network signaled values, according to an aspect. As discussed, 3GPP and similar systems that send network signaled parameter values to mobile devices have to be in compliance in order to communicate in the system and/or to mitigate interference with systems coexisting in the same or a similar frequency space. Due to changes in the standards and modifications in 3GPP and/or coexisting systems, the network signaled requirements could change in the future. For example some requirements might be relaxed. If a new network signaled value is introduced to support the modifications, legacy mobile devices may not be able to operate anymore. As a possible solution, an optional network signaled value can be introduced on top of the old network signaled value.

Further, different networks in different geographical areas can have different requirements, which can require support of a different version of a network signaled (e.g., a network signaled with a tighter requirement). Some frequency bands can have tighter SEM requirements but can still allow some mobile devices that do not support them to operate. This is possible provided the number of mobile devices that do not support the additional requirements is small (e.g., roaming). It is to be appreciated, however, that the more mobile devices not supporting the requirements, the higher the chance of interference from those devices.

The network can signal additional network signaled values. For example, priority values can be assigned to the network signaled values, and the mobile devices can choose the network signaled value to comply with based on these values. The mandatory nature of traditional network signaled values does not allow the support of optional network signaled values. Under such circumstances, it is not possible to support emission mask modifications with backwards compatibility.

Some procedures support signaling of base (main values) and additional values of system parameters in information elements. This kind of signaling method assumes that the additional value is a subset or an enhanced value of the base value and cannot be signaled as a base value. Moreover, system parameters can be introduced, which can be used as a base value or as an additional value. For example, a network can advertise a value "NS_x" as base value and "NS_y" as optional value. The requirements of NS_y are more stringent, but if the number of mobile devices that use NS_x is small enough, then interference is not a problem. If, however, the number of NS_x mobile devices increases beyond a certain point, the network has to start signaling NS_y as the only system value. If NS_y is defined only as an optional value, the network cannot switch to signal only NS_y. If NS_y can be used as both main and optional then the network can only signal NS_y, and mobile devices that do not support it cannot access the system.

In an aspect, optional or additional network signaled values are provided. These optional network signaled values can be signaled by the network in addition to the mandatory network signaled value through higher layer signaling. The mobile devices that are compatible with the optional value can comply with it. The mobile devices that are not compatible with the optional value should use the mandatory network signaled value. The network can also signal a list of network signaled values and their priorities. The mobile devices can choose the network signaled with the highest priority among the supported ones. In another aspect, system parameters can be defined as both main values and additional values. This can increase the flexibility of network management.

With continuing reference to FIG. 3, method 300 can be performed by a communications apparatus, such as an access point. Method 300 starts, at 302, when at least two network signaled parameter values are generated. For example, a first network signaled value generated can be a mandatory value and a second network signaled value generated can be an optional value (e.g. at least mandatory value is generated and the other values are optionally generated). In accordance with some aspects, first network signaled value is generated for a plurality of mobile devices and second network signaled value is generated for a subset of the plurality of mobile devices. According to some aspects, second network signaled value relates to an additional optional spectrum emission mask (SEM). In accordance with some aspects, second network signaled value is a base network signaled value that can be utilized by a mobile device in place of first network signaled value.

At 304, the generated network signaled values are transmitted to at least one mobile device. In accordance with some aspects, first, second, and third network signaled values are conveyed to at least one mobile device at substantially the same time.

According to some aspects, method 300 comprises determining first network signaled value is supported by a first set of mobile devices and second network signaled value is supported by a second set of mobile devices. The determination can be based on revision levels of mobile devices that are located within a communication environment or that are expected to be located with the environment (e.g., based on an upcoming release or upcoming revision level change). The transmission, at 304, comprises transmitting first network signaled value and second network signaled value to a plurality of mobile devices that comprises the first set of mobile devices and the second set of mobile devices.

In accordance with some aspects, method 300 includes defining a priority related to second network signaled value, at 306. In accordance with some aspects, defining the priority comprises establishing a message structure, wherein the priority is implicit in the message structure. In accordance with some aspects, the priority assigned to second network signaled value is a higher priority than the priority assigned to first network signaled value. Assigning a higher priority to second (or subsequent) network signaled values can provide that mobile devices capable of supporting second (or subsequent) network signaled values utilize second (or subsequent) network signaled values.

The priority is sent to the at least one mobile device, at 308. In accordance with some aspects, the priority is defined at substantially the same time as network signaled values are generated and is transmitted at substantially the same time as the network signaled values are sent.

In accordance with some aspects, a computer program product can include a computer-readable medium that comprises codes for carrying out various aspects of method 300. Computer-readable medium can include a first set of codes for causing a computer to generate a first network signaled value and a second network signaled value. Computer-readable medium can also include a second set of codes for causing computer to transmit first network signaled value and second network signaled value to at least one mobile device. First network signaled value can be a mandatory value and second network signaled value can be an optional value.

In accordance with some aspects, computer-readable medium further comprises a third set of codes for causing computer to generate first network signaled value for a plurality of mobile devices and generating second network signaled value for a subset of the plurality of mobile devices.

According to some aspects, computer-readable medium further comprises a third set of codes for causing computer to define a priority related to second network signaled value and a fourth set of codes for causing computer to send the priority to at least one mobile device. In accordance with some aspects, computer-readable medium further comprises a third set of codes for causing computer to establish a message structure, wherein a priority is implicit in the message structure.

Figure 4:
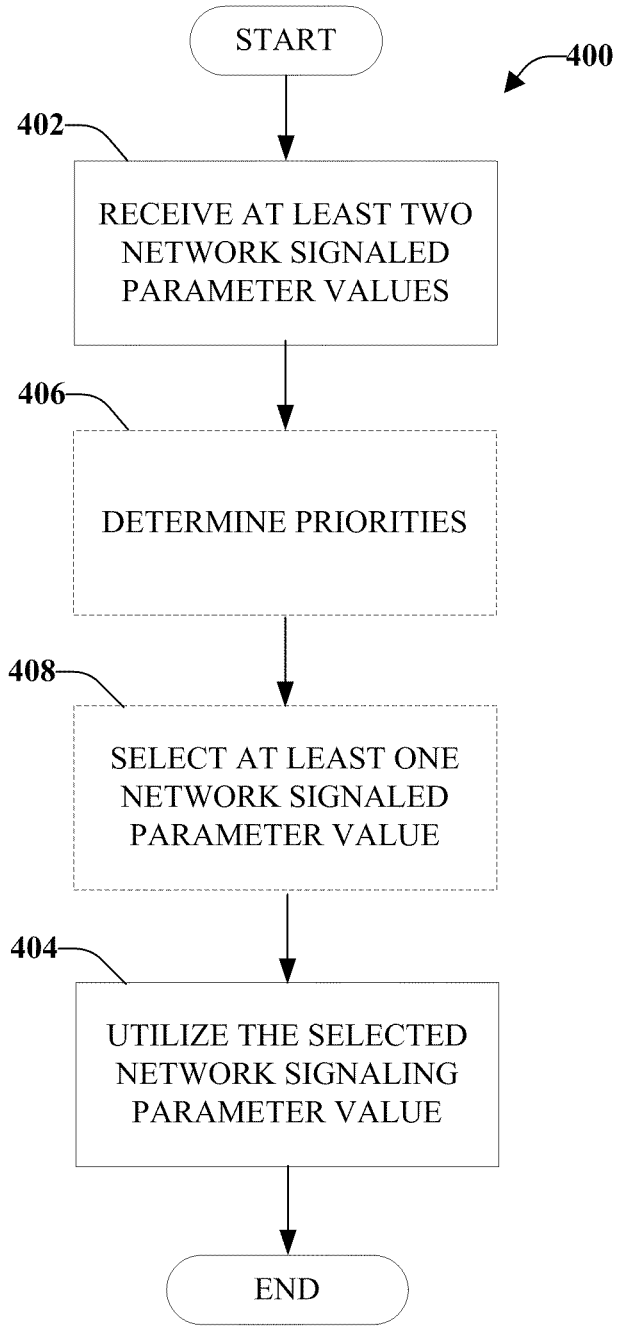
FIG. 4 illustrates a method that facilitates support of optional network signaled values, according to an aspect.

FIG. 4 illustrates a method 400 that facilitates support of optional network signaled parameter values, according to an aspect. Method 400 can be performed by a communications apparatus, such as a mobile device. Method 400 starts, at 402, when network signaled values are received from an access point. In accordance with some aspects, a first network signaled value and a second network signaled value are received, wherein first network signaled value is a mandatory value and second network signaled value is an optional value. Thus, at least the mandatory value is signaled by access point and optional signals can be signaled additional when network signaling is applied. In accordance with some aspects, second network signaled value relates to an additional optional spectrum emission mask (SEM). According to some aspects, second network signaled value is a base network signaled value that can be utilized standalone, without first signaled value. According to some aspects, three or more network signaled values are received.

At 404, at least one of the received network signaled values are utilized as a function of a priority. In accordance with some aspects, second network signaled value can be utilized at substantially the same time as first network signaled values. According to some aspects, second network signaled value is used as an alternative to first network signaled value.

In an aspect, method 400 can include, determining, at 406, priorities associated with the received network signaled values. In accordance with some aspects, the determining comprises determining the priority as a function of a signaled priority value. According to some aspects, the determining comprises determining the priority based on a signaling structure. In accordance with some aspects, second network signaled value is prioritized over first network signaled value.

At 408, at least one of the network signaled values is selected from a plurality of received optional network signaled values based on the priority. The plurality of received optional network signaled values can comprise a set of second network signaled values that are supported. According to some aspects, a plurality of network signaled values are received and at least one of the plurality of received optional network signaled values is used at substantially the same time as the second network signaled value.

In accordance with some aspects, a computer program product can include a computer-readable medium that comprises codes for carrying out various aspects of method 400. Computer-readable medium can include a first set of codes for causing a computer to obtain a first network signaled value and a second network signaled value from an access point. Computer-readable medium can also include a second set of codes for causing computer to apply first network signaled value or second network signaled value as a function of a priority. First network signaled value is a mandatory value and second network signaled value is an optional value.

In accordance with some aspects, computer-readable medium further comprises a third set of codes for causing computer to utilize second network signaled value with or instead of first network signaled value. According to some aspects, computer-readable medium further comprises a third set of codes for causing computer to determine the priority associated with second network signaled value and a fourth set of codes for causing computer to select second network signaled value from a plurality of received optional network signaled values based on the priority.

Figure 5:
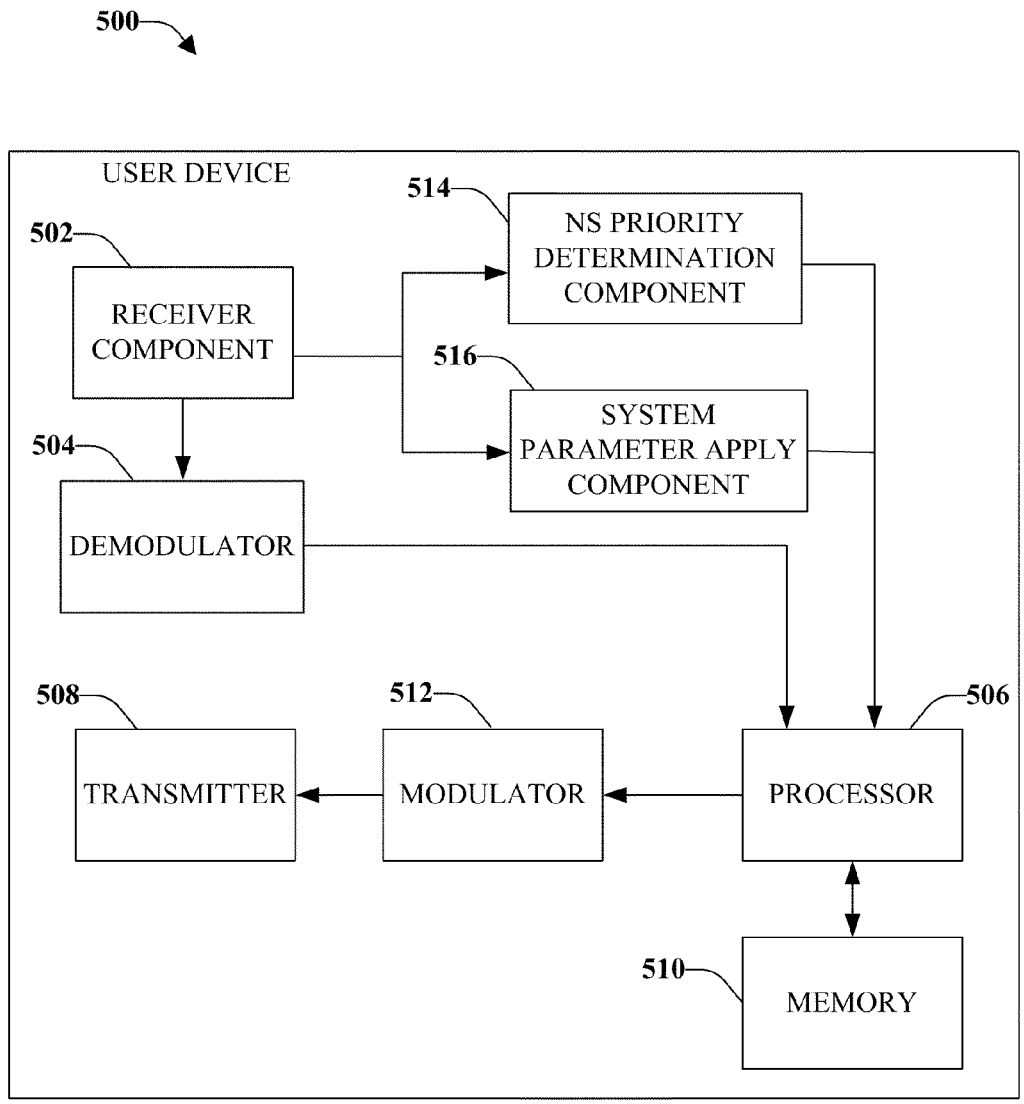
FIG. 5 illustrates a system that facilitates support for optional system parameter values in accordance with one or more of the disclosed aspects.

With reference now to FIG. 5, illustrated is a system 500 that facilitates support for optional system parameter values in accordance with one or more of the disclosed aspects. System 500 can reside in a user device. System 500 comprises a receiver component 502 that can receive a signal from, for example, a receiver antenna. Receiver component 502 can perform typical actions thereon, such as filtering, amplifying, downconverting, etc. the received signal. Receiver component 502 can also digitize the conditioned signal to obtain samples. A demodulator 504 can obtain received symbols for each symbol period, as well as provide received symbols to a processor 506.

Processor 506 can be a processor dedicated to analyzing information received by receiver component 502 and/or generating information for transmission by a transmitter 508. In addition or alternatively, processor 506 can control one or more components of system 500, analyze information received by receiver component 502, generate information for transmission by transmitter 508, and/or control one or more components of system 500. Processor 506 may include a controller component capable of coordinating communications with additional user devices.

System 500 can additionally comprise memory 510 operatively coupled to processor 506. Memory 510 can store information related to coordinating communications and any other suitable information. Memory 510 can additionally store protocols associated with optional system parameter values. System 500 can further comprise a symbol modulator 512, wherein transmitter 508 transmits the modulated signal.

Receiver component 502 is further operatively coupled to a network signaled NS priority determination component 514 that is configured to discern or otherwise receive priorities associated with network signaled parameter values. Additionally, receiver component 502 can be operatively coupled to a system parameter apply component 516 that that is configured to utilize the network signaled parameter values to facilitate wireless communications.

Figure 6:
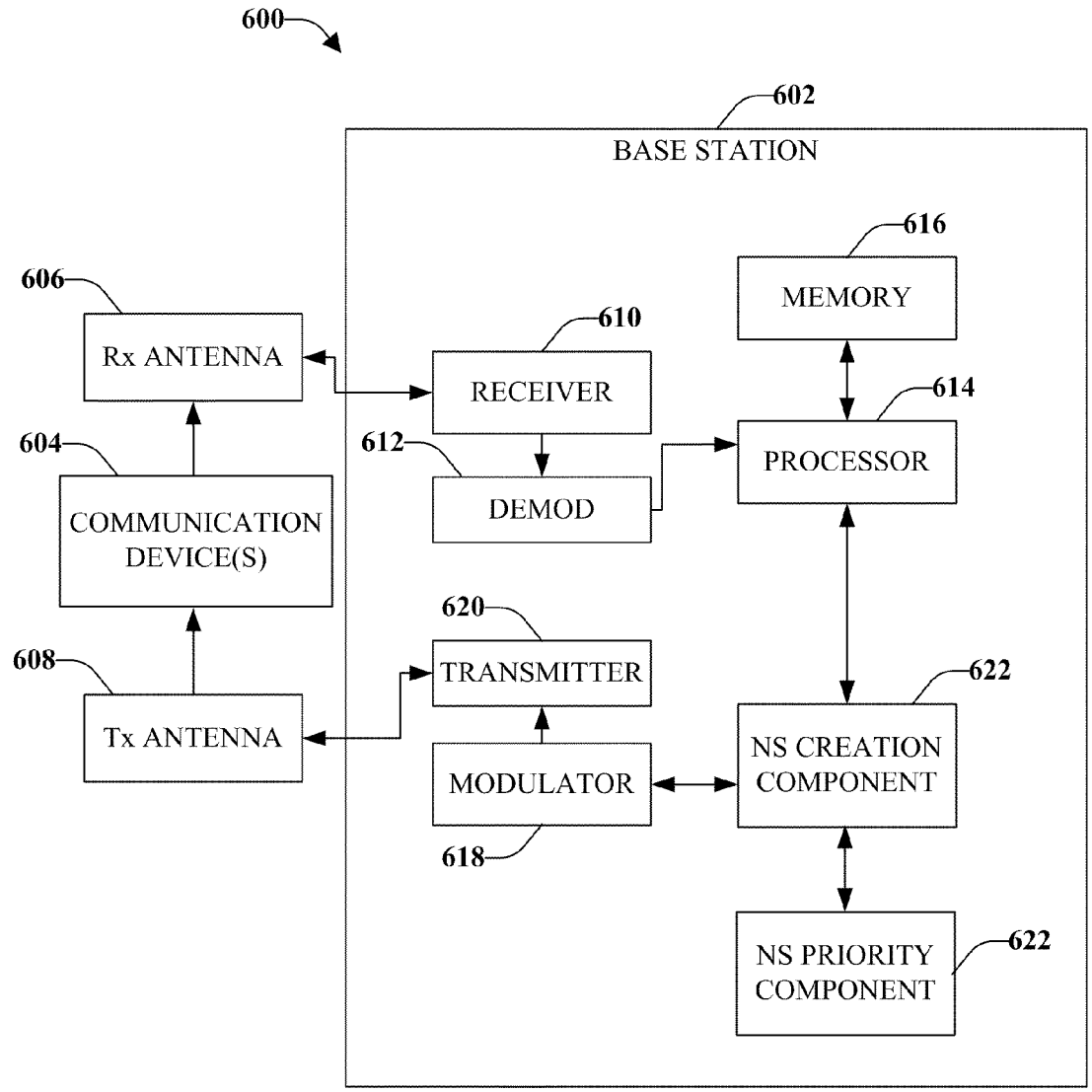
FIG. 6 illustrates a system that facilitates transmission of optional system parameter values to one or more mobile devices in a communications network in accordance with various aspects presented herein.

FIG. 6 is an illustration of a system 600 that facilitates transmission of optional system parameter values to one or more mobile devices in a communications network in accordance with various aspects presented herein. System 600 comprises an access point or base station 602. As illustrated, base station 602 receives signal(s) from one or more communication devices 604 (e.g., user device) by a receive antenna 606, and transmits to the one or more communication devices 604 through a transmit antenna 608.

Base station 602 comprises a receiver 610 that receives information from receive antenna 606 and is operatively associated with a demodulator 612 that demodulates received information. Demodulated symbols are analyzed by a processor 614 that is coupled to a memory 616 that stores information related to optional system parameter values. A modulator 618 can multiplex the signal for transmission by a transmitter 620 through transmit antenna 608 to communication devices 604.

Processor 614 is further coupled to a network signaled NS creation component 622 that is configured to create a plurality of network signaled parameter values. NS creation component 622 defines network signaled system parameter values for utilization by one or more communication devices. Processor 614 can also be coupled to a NS priority component 624 that is configured to assign priorities to one or more of the network signaled values.

Figure 7:
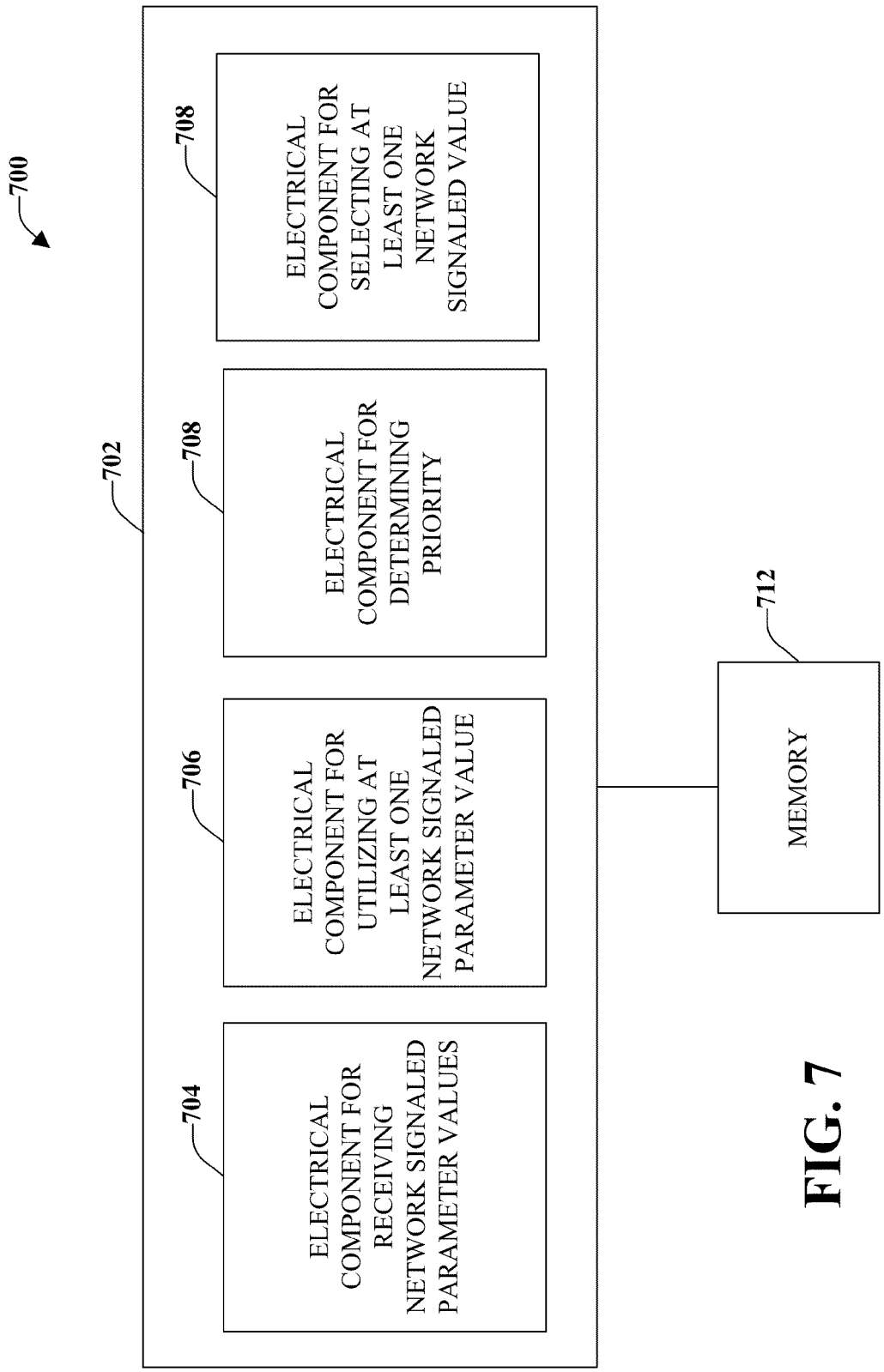
FIG. 7 illustrates an example system that receives a plurality of optional system parameter values and utilizes at least one of the values for communication in a wireless communications network, according to an aspect.

With reference to FIG. 7, illustrated is an example system 700 that receives a plurality of optional system parameter values and utilizes at least one of the values for communication in a wireless communications network, according to an aspect. System 700 may reside at least partially within a mobile device. It is to be appreciated that system 700 is represented as including functional blocks, which may be functional blocks that represent functions implemented by a processor, software, or combination thereof (e.g., firmware).

System 700 includes a logical grouping 702 of electrical components that can act separately or in conjunction. Logical grouping 702 may include an electrical component 704 for receiving a first network signaled value and a second network signaled value from an access point. Also included in logical grouping 702 is an electrical component 706 for utilizing first network signaled value or second network signaled value as a function of a priority. First network signaled value is a mandatory value and second network signaled value is an optional value. Second network signaled value can be assigned a higher priority than the first network signaled value. According to some aspects, electrical component 704 can comprise an electrical component for using second network signaled value with or as an alternative to first network signaled value.

In accordance with some aspects, logical grouping 702 comprises an electrical component 708 for determining a priority associated with second network signaled value. In accordance with some aspects, electrical component 708 comprises an electrical component for determining the priority from a signaled priority value. In some aspects, electrical component 708 comprises an electrical component for determining the priority based on a signaling structure.

Also included can be an electrical component 710 for selecting second network signaled value from a plurality of received optional network signaled values based on the priority. The plurality of received optional network signaled values can comprise a set of second network signaled values that are supported. In accordance with some aspects, logical grouping 708 comprises an electrical component for utilizing at least one of a plurality of received optional network signaled values in conjunction with second network signaled value.

Additionally, system 700 can include a memory 712 that retains instructions for executing functions associated with electrical components 704, 706, 708 and 710 or other components. While shown as being external to memory 712, it is to be understood that one or more of electrical components 704, 706, 708 and 710 may exist within memory 712.

Figure 8:
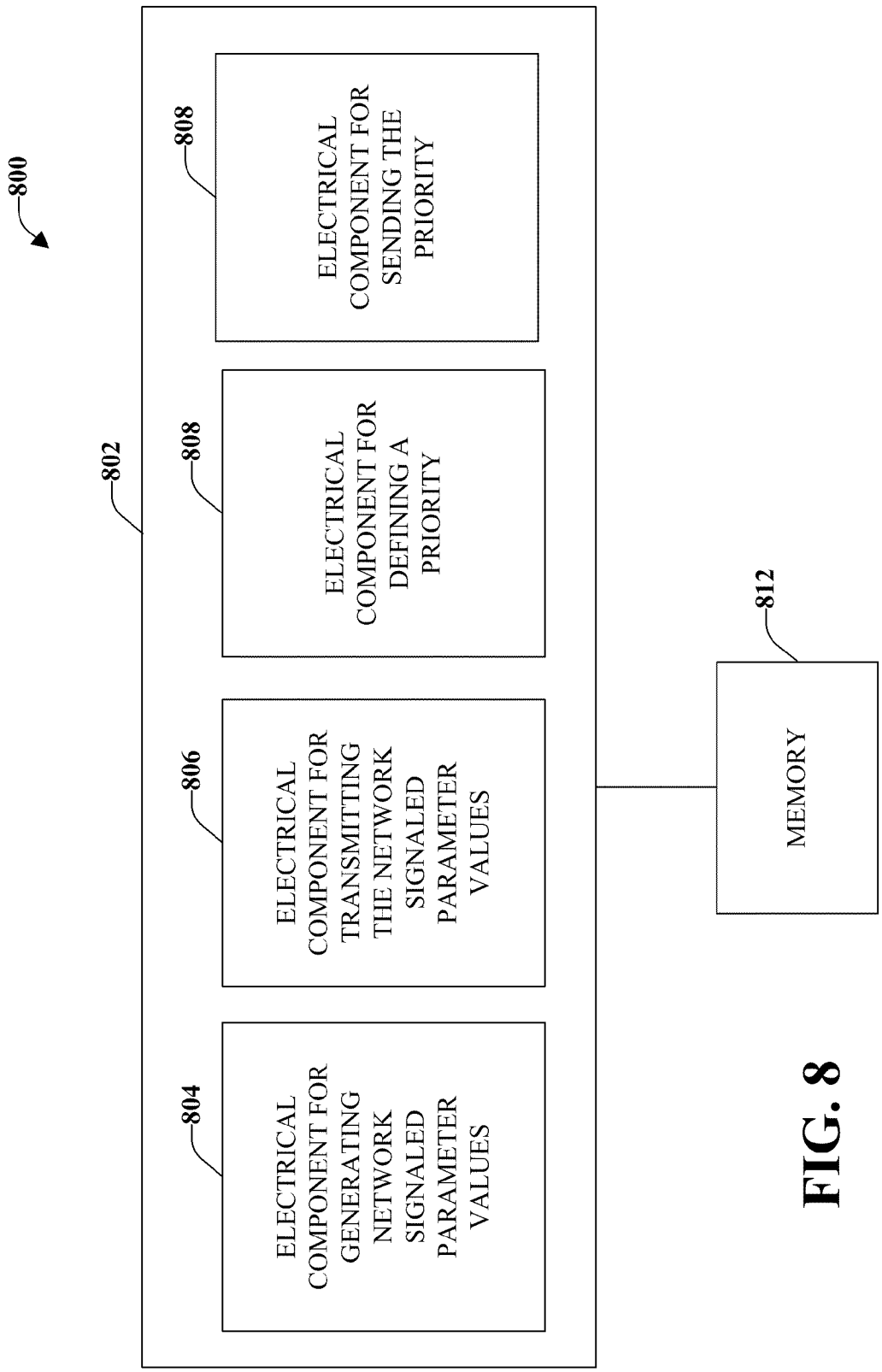
FIG. 8 illustrates an example system that conveys a plurality of network signaled values to a plurality of mobile devices, according to an aspect.

With reference to FIG. 8, illustrated is an example system 800 that conveys a plurality of network signaled values to a plurality of mobile devices, according to an aspect. System 800 may reside at least partially within an access point. It is to be appreciated that system 800 is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 may include an electrical component 804 for generating a first network signaled value and a second network signaled value. In accordance with some aspects, electrical component 804 comprises an electrical component for producing first network signaled value for a plurality of mobile devices and second network signaled value for a subset of the plurality of mobile devices.

Also included in logical grouping 802 is an electrical component 806 for transmitting first network signaled value and second network signaled value to at least one mobile device. First network signaled value is a mandatory value and second network signaled value is an optional value.

In accordance with some aspects, logical grouping 802 comprises an electrical component 808 for defining a priority related to second network signaled value and an electrical component 810 for sending the priority to the at least one mobile device. According to some aspects, electrical component 808 comprises an electrical component for establishing a message structure, wherein a priority is implicit in the message structure.

Additionally, system 800 can include a memory 812 that retains instructions for executing functions associated with electrical components 804, 806, 808, and 810 or other components. While shown as being external to memory 812, it is to be understood that one or more of electrical components 804, 806, 808, and 810 may exist within memory 812.

Figure 9:
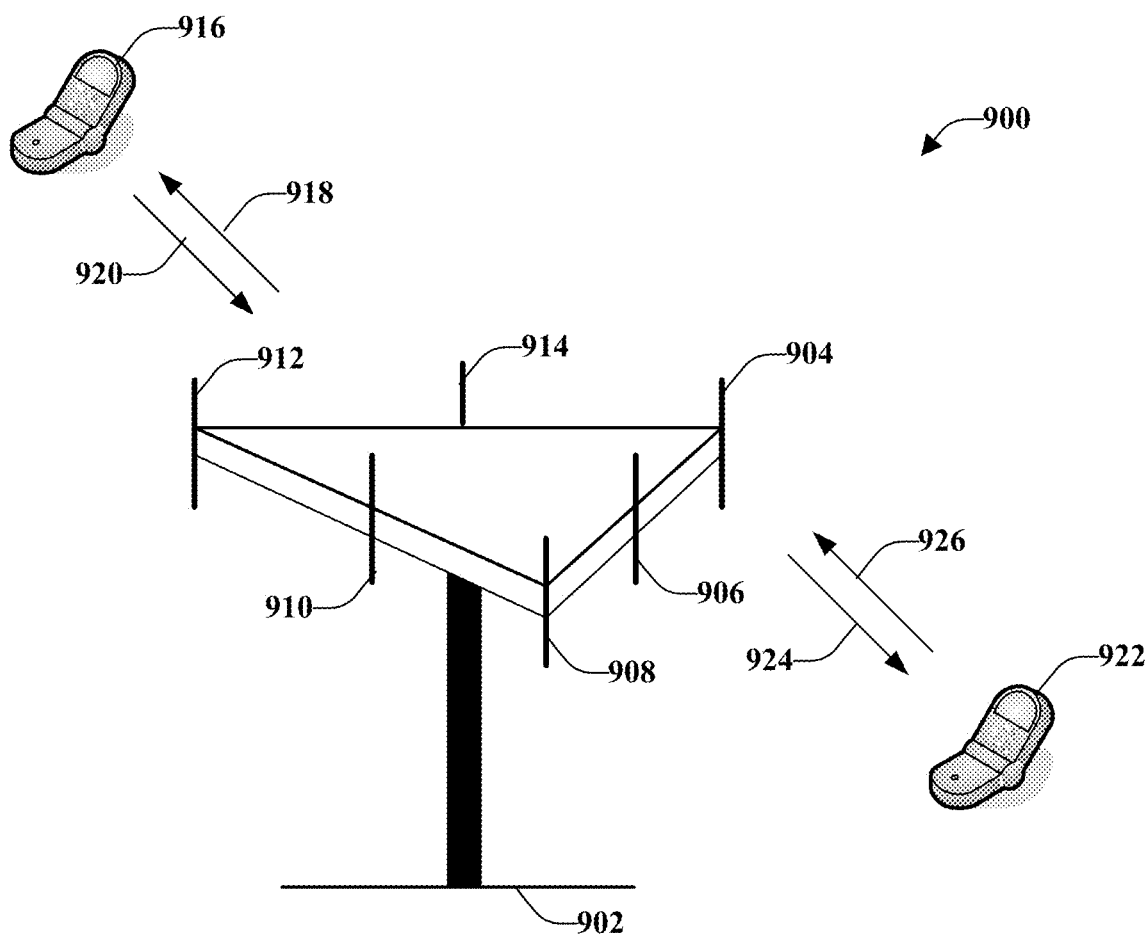
FIG. 9 illustrates a multiple access wireless communication system according to one or more aspects.

Referring now to FIG. 9, a multiple access wireless communication system 900 according to one or more aspects is illustrated. A wireless communication system 900 can include one or more base stations in contact with one or more user devices. Each base station provides coverage for a plurality of sectors. A three-sector base station 902 is illustrated that includes multiple antenna groups, one including antennas 904 and 906, another including antennas 908 and 910, and a third including antennas 912 and 914. According to the figure, only two antennas are shown for each antenna group, however, more or fewer antennas may be utilized for each antenna group. Mobile device 916 is in communication with antennas 912 and 914, where antennas 912 and 914 transmit information to mobile device 916 over forward link 918 and receive information from mobile device 916 over reverse link 920. Forward link (or downlink) refers to communication link from base stations to mobile devices, and reverse link (or uplink) refers to communication link from mobile devices to base stations. Mobile device 922 is in communication with antennas 904 and 906, where antennas 904 and 906 transmit information to mobile device 922 over forward link 924 and receive information from mobile device 922 over reverse link 926. In a FDD system, for example, communication links 918, 920, 924, and 926 might utilize different frequencies for communication. For example, forward link 918 might use a different frequency than the frequency utilized by reverse link 920.

Each group of antennas and/or the area in which they are designated to communicate may be referred to as a sector of base station 902. In one or more aspects, antenna groups each are designed to communicate to mobile devices in a sector or the areas covered by base station 902. A base station may be a fixed station used for communicating with mobile devices.

In communication over forward links 918 and 924, transmitting antennas of base station 902 can utilize beamforming in order to improve a signal-to-noise ratio of forward links for different mobile devices 916 and 922. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 10:
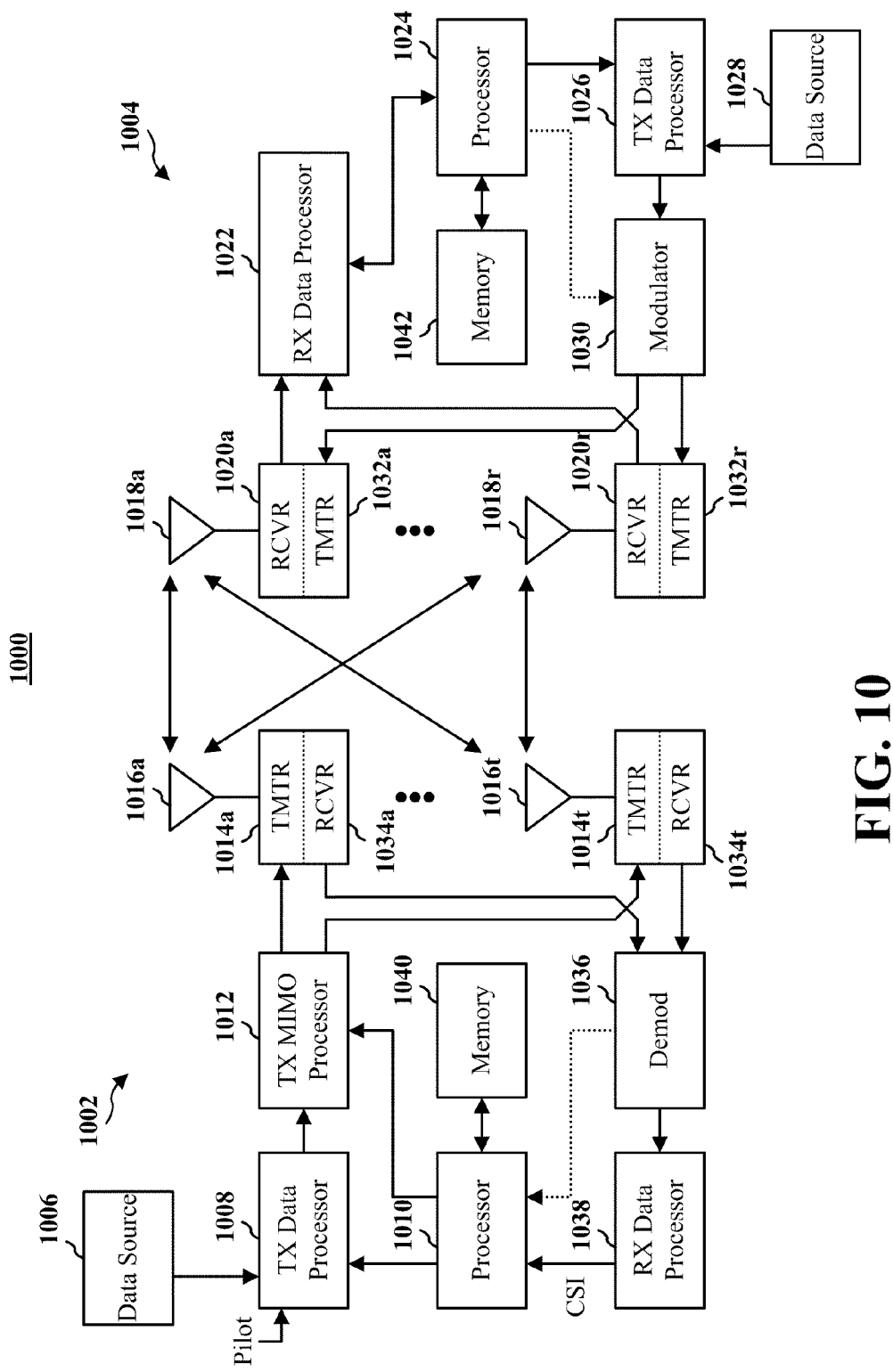
FIG. 10 illustrates an example wireless communication system, according to an aspect.

FIG. 10 illustrates an example wireless communication system 1000, according to an aspect. The wireless communication system 1000 depicts one base station 1002 and one mobile device 1004 for sake of brevity. However, it is to be appreciated that wireless communication system 1000 can include more than one base station and/or more than one mobile device, wherein additional base stations and/or mobile devices can be substantially similar or different from example base station 1002 and mobile device 1004 described below. In addition, it is to be appreciated that base station 1002 and/or mobile device 1004 can employ the systems and/or methods described herein to facilitate wireless communication there between.

At base station 1002, traffic data for a number of data streams is provided from a data source 1006 to a transmit (TX) data processor 1008. According to an example, each data stream can be transmitted over a respective antenna. TX data processor 1008 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1004 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1010.

The modulation symbols for the data streams can be provided to a TX MIMO processor 1012, which can further process the modulation symbols (e.g., for OFDM). TX MIMO processor 1012 then provides NT modulation symbol streams to NT transmitters (TMTR) 1014a through 1014t. In various embodiments, TX MIMO processor 1012 applies beamforming weights to the symbols of the data streams and to the antenna from which the symbol is being transmitted.

Each transmitter 1014 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1014a through 1014t are transmitted from NT antennas 1016a through 1016t, respectively.

At mobile device 1004, the transmitted modulated signals are received by NR antennas 1018a through 1018r and the received signal from each antenna 1018 is provided to a respective receiver (RCVR) 1020a through 1020r. Each receiver 1020 conditions (e.g., filters, amplifies, and down-converts) a respective signal, digitizes the conditioned signal to provide samples, and further processes the samples to provide a corresponding "received" symbol stream.

An RX data processor 1022 can receive and process the NR received symbol streams from NR receivers 1020 based on a particular receiver processing technique to provide NT "detected" symbol streams. RX data processor 1022 can demodulate, deinterleave, and decode each detected symbol stream to recover the traffic data for the data stream. The processing by RX data processor 1022 is complementary to that performed by TX MIMO processor 1012 and TX data processor 1008 at base station 1002.

A processor 1024 can periodically determine which precoding matrix to utilize as discussed above. Further, processor 1024 can formulate a reverse link message comprising a matrix index portion and a rank value portion.

The reverse link message can comprise various types of information regarding the communication link and/or the received data stream. The reverse link message can be processed by a TX data processor 1026, which also receives traffic data for a number of data streams from a data source 1028, modulated by a modulator 1030, conditioned by transmitters 1032a through 1032r, and transmitted back to base station 1002.

At base station 1002, the modulated signals from mobile device 1004 are received by antennas 1016, conditioned by receivers 1034a though 1034t, demodulated by a demodulator 1036, and processed by a RX data processor 1038 to extract the reverse link message transmitted by mobile device 1004. Further, processor 1010 can process the extracted message to determine which precoding matrix to use for determining the beamforming weights.

Processors 1010 and 1024 can direct (e.g., control, coordinate, manage, etc.) operation at base station 1002 and mobile device 1004, respectively. Respective processors 1010 and 1024 can be associated with memory 1040 and 1042 that store program codes and data. Processors 1010 and 1024 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method, comprising:
   receiving a first network signaled value and a second network signaled value from an access point;
   utilizing the first network signaled value or the second network signaled value as a function of a priority, wherein the first network signaled value is a mandatory value and the second network signaled value is an optional value; and
   determining a priority associated with the second network signaled value based on an order of the network signaled values in a signaling structure, wherein the priority is implicit in the signaling structure.

2. The method of claim 1, wherein the utilizing comprises utilizing the second network signaled value with or in place of the first network signaled value.

3. The method of claim 2, wherein the utilizing the second network signaled value comprises prioritizing the second network signaled value as a higher priority than the first network signaled value.

4. The method of claim 2, further comprising determining the first network signaled value is not supported before utilizing the second network signaled value.

5. The method of claim 1, further comprising:
   selecting the second network signaled value from a plurality of received optional network signaled values based on the priority.

6. The method of claim 1, wherein the determining comprises determining the priority from a signaled priority value.

7. The method of claim 5, wherein the plurality of received optional network signaled values comprise a set of second network signaled values that are supported.

8. The method of claim 1, wherein the second network signaled value relates to an additional optional spectrum emission mask (SEM).

9. A communications apparatus, comprising:
   a memory that retains instructions related to obtaining from an access point a first network signaled value and a second network signaled value, applying the first network signaled value or the second network signaled value for communication in a communications network as a function of a priority, wherein the first network signaled value is a mandatory value and the second network signaled value is an optional value, and determining a priority associated with the second network signaled value based on an order of the network signaled values in a signaling structure, wherein the priority is implicit in the signaling structure; and
   a processor, coupled to the memory, configured to execute the instructions retained in the memory.

10. The communications apparatus of claim 9, wherein the memory retains further instructions related to utilizing the second network signaled value as an alternative to the first network signaled value.

11. The communications apparatus of claim 10, wherein the memory retains further instructions related to assigning the second network signaled value a higher priority than the first network signaled value.

12. The communications apparatus of claim 10, wherein the memory retains further instructions related to utilizing the second network signaled value if the first network signaled value is not supported.

13. The communications apparatus of claim 9, wherein the memory retains further instructions related to selecting the second network signaled value from a plurality of received optional network signaled values based on the priority, wherein the plurality of received optional network signaled values comprise a set of second network signaled values that are supported.

14. The communications apparatus of claim 9, wherein the memory retains further instructions related to determining the priority based on a signaled priority value.

15. A communications apparatus that supports optional system parameter values, comprising:
   means for receiving a first network signaled value and a second network signaled value from an access point;
   means for utilizing the first network signaled value or the second network signaled value as a function of a priority, wherein the first network signaled value is a mandatory value and the second network signaled value is an optional value and the second network signaled value is assigned a higher priority than the first network signaled value; and
   means for determining a priority associated with the second network signaled value based on an order of the network signaled values in a signaling structure, wherein the priority is implicit in the signaling structure.

16. The communications apparatus of claim 15, wherein the means for utilizing comprises means for using the second network signaled value as an alternative to the first network signaled value.

17. The communications apparatus of claim 15, further comprising:
   means for selecting the second network signaled value from a plurality of received optional network signaled values based on the priority, wherein the plurality of received optional network signaled values comprise a set of second network signaled values that are supported.

18. The communications apparatus of claim 15, wherein the means for determining comprises means for determining the priority from a signaled priority value.

19. A computer program product, comprising:
a non-transitory computer-readable medium comprising:
a first set of codes for causing a computer to obtain a first network signaled value and a second network signaled value from an access point;
a second set of codes for causing the computer to apply the first network signaled value or the second network signaled value as a function of a priority, wherein the first network signaled value is a mandatory value and the second network signaled value is an optional value; and
a third set of codes for causing the computer to determine a priority associated with the second network signaled value based on an order of the network signaled values in a signaling structure, wherein the priority is implicit in the signaling structure.

20. The computer program product of claim 19, wherein the non-transitory computer-readable medium further comprises a fourth set of codes for causing the computer to utilize the second network signaled value with or instead of the first network signaled value.

21. The computer program product of claim 19, wherein the non-transitory computer-readable medium further comprising:
a fourth set of codes for causing the computer to select, based on the priority, the second network signaled value from a plurality of received optional network signaled values that comprise a set of second network signaled values that are supported.

22. A method, comprising:
generating a first network signaled value and a second network signaled value;
transmitting the first network signaled value and the second network signaled value to at least one mobile device, wherein the first network signaled value is a mandatory value and the second network signaled value is an optional value; and
defining a priority related to the second network signaled value based on an order of the network signaled values in a message structure, wherein the priority is implicit in the message structure.

23. The method of claim 22, wherein the generating comprises generating the first network signaled value for a plurality of mobile devices and generating the second network signaled value for a subset of the plurality of mobile devices.

24. The method of claim 22, further comprising:
determining the first network signaled value is supported by a first set of mobile devices and the second network signaled value is supported by a second set of mobile devices; wherein the transmitting comprises transmitting the first network signaled value and the second network signaled value to a plurality of mobile devices that comprises the first set of mobile devices and the second set of mobile devices.

25. The method of claim 22, further comprising:
sending the priority to the at least one mobile device.

26. The method of claim 22, wherein the defining comprises assigning a priority to the second network signaled value that is a higher priority than the priority assigned to the first network signaled value.

27. The method of claim 22, further comprising conveying at least a third network signaled value to the at least one mobile device.

28. The method of claim 22, wherein the second network signaled value relates to an additional optional spectrum emission mask (SEM).

29. A communications apparatus, comprising:
a memory that retains instructions related to generating a first network signaled value and a second network signaled value, transmitting the first network signaled value and the second network signaled value to at least one mobile device, wherein the first network signaled value is a mandatory value and the second network signaled value is an optional value, and defining a priority related to the second network signaled value based on an order of the network signaled values in a message structure, wherein the priority is implicit in the message structure; and
a processor, coupled to the memory, configured to execute the instructions retained in the memory.

30. The communications apparatus of claim 29, wherein the memory retains further instructions related to generating the first network signaled value for a plurality of mobile devices and generating the second network signaled value for a subset of the plurality of mobile devices.

31. The communications apparatus of claim 29, wherein the memory retains further instructions related to sending the priority to the at least one mobile device.

32. The communications apparatus of claim 29, wherein the memory retains further instructions related to assigning a priority to the second network signaled value that is a higher priority than the priority assigned to the first network signaled value.

33. The communications apparatus of claim 30, wherein the memory retains further instructions related to conveying at least a third network signaled value to the at least one mobile device.

34. A communications apparatus that supports optional system parameter values, comprising:
means for generating a first network signaled value and a second network signaled value;
means for transmitting the first network signaled value and the second network signaled value to at least one mobile device, wherein the first network signaled value is a mandatory value and the second network signaled value is an optional value; and
means for defining a priority related to the second network signaled value based on an order of the network signaled values in a message structure, wherein the priority is implicit in the message structure.

35. The communications apparatus of claim 34, wherein the means for generating comprises means for producing the first network signaled value for a plurality of mobile devices and the second network signaled value for a subset of the plurality of mobile devices.

36. The communications apparatus of claim 34, further comprising:
means for sending the priority to the at least one mobile device.

37. A computer program product, comprising:
a non-transitory computer-readable medium comprising:
a first set of codes for causing a computer to generate a first network signaled value and a second network signaled value; and
a second set of codes for causing the computer to transmit the first network signaled value and the second network signaled value to at least one mobile device, wherein the first network signaled value is a mandatory value and the second network signaled value is an optional value; and a third set of codes for causing the computer to define a priority related to the second network signaled value based on an order of the network signaled values in a message structure, wherein the priority is implicit in the message structure.

38. The computer program product of claim 37, wherein the non-transitory computer-readable medium further comprises a fourth set of codes for causing the computer to generate the first network signaled value for a plurality of mobile devices and generating the second network signaled value for a subset of the plurality of mobile devices.

39. The computer program product of claim 37, wherein the non-transitory computer-readable medium further comprising:
   a fourth set of codes for causing the computer to send the priority to the at least one mobile device.

* * * * *